(12) United States Patent
Sahi

(10) Patent No.: US 7,686,397 B2
(45) Date of Patent: Mar. 30, 2010

(54) EASY ENTRY SEAT TRACK RELEASE MECHANISM

(75) Inventor: Ashok K. Sahi, West Bloomfield, MI (US)

(73) Assignee: Intier Automotive Inc., New Market, Ontario (CA)

( * ) Notice: Subject to any disclaimer, the term of this patent is extended or adjusted under 35 U.S.C. 154(b) by 399 days.

(21) Appl. No.: 11/660,252

(22) PCT Filed: Aug. 19, 2005

(86) PCT No.: PCT/CA2005/001260

§ 371 (c)(1),
(2), (4) Date: Feb. 15, 2007

(87) PCT Pub. No.: WO2006/017933

PCT Pub. Date: Feb. 23, 2006

(65) Prior Publication Data

US 2007/0246985 A1    Oct. 25, 2007

Related U.S. Application Data

(60) Provisional application No. 60/603,435, filed on Aug. 20, 2004.

(51) Int. Cl.
*B60N 2/04* (2006.01)

(52) U.S. Cl. .............. 297/334; 297/334.14; 297/334.15

(58) Field of Classification Search ................ 297/334, 297/331, 340, 329, 325, 322, 344.14, 344.12, 297/344.15; 296/65.01, 65.05, 65.09
See application file for complete search history.

(56) References Cited

U.S. PATENT DOCUMENTS

| 3,700,203 | A | 10/1972 | Adams |
| 4,932,706 | A | 6/1990 | Wainwright et al. |
| 5,622,406 | A | 4/1997 | Meschkat et al. |
| 6,382,491 | B1 | 5/2002 | Hauser et al. |
| 6,817,669 | B2 * | 11/2004 | Roth et al. .................. 297/340 |
| 7,040,684 | B2 * | 5/2006 | Tame et al. .............. 296/65.09 |
| 2003/0001419 | A1 | 1/2003 | Roth et al. |

FOREIGN PATENT DOCUMENTS

JP          10095256          4/1998

OTHER PUBLICATIONS

English Abstract of JP 10095256. International Search Report and Written Opinion for PCT/CA2005/001260 Dated Dec. 20, 2005.

* cited by examiner

*Primary Examiner*—Milton Nelson, Jr.
(74) *Attorney, Agent, or Firm*—Clark Hill PLC

(57) ABSTRACT

A seat assembly for an automotive includes a seat cushion and a seat back pivotally coupled to the seat cushion. A riser mechanism extends between the seat cushion and a vehicle floor. The riser mechanism includes spaced apart front, center, and rear legs each pivotally movable at opposing upper and lower ends. A latch mechanism is operably coupled to each of the center legs for movement between a latched position preventing movement of the front, center, and rear legs relative to the floor and an unlatch position allowing pivotal movement of each of the front, center, and rear legs relative to the floor for moving the seat assembly between a seating position and at least one of an easy entry and forwardly dumped positions.

18 Claims, 9 Drawing Sheets

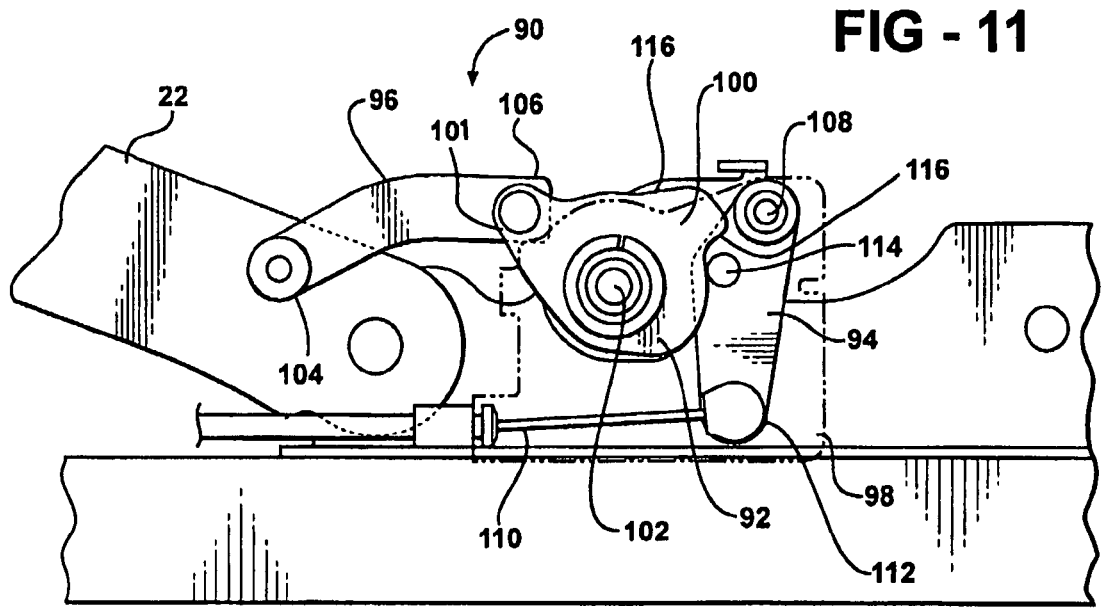

EASY ENTRY SEAT TRACK RELEASE MECHANISM

FIELD OF THE INVENTION

The invention relates to a seat assembly for an automotive vehicle. More particularly, the invention relates to a riser mechanism for allowing movement of a seat assembly between a seating position, an easy entry position, and a forwardly dumped position.

DESCRIPTION OF RELATED ART

Automotive vehicles include seat assemblies for supporting occupants within a passenger compartment. Each seat assembly typically includes a seat cushion and a seat back operatively coupled to the seat cushion by a recliner mechanism for allowing selective pivotal adjustment of the seat back relative to the seat cushion between a plurality of reclined seating positions. In addition, the seat back is often movable to a generally horizontal, forwardly folded position to present a load floor surface on the back of the seat back.

It is known in the automotive seating art to mount a four bar linkage between the seat cushion and a floor of the automotive vehicle for moving the seat assembly between a seating position, in which the seat cushion is spaced above the floor, and a forwardly folded position, in which the seat cushion lies against the floor.

It is also known in the automotive seating art to provide a seat track assembly coupled to a bottom surface of the seat cushion for fore and aft movement of the seat assembly along the floor. The seat track assembly typically includes a lower track secured to the floor and an upper track slidably engaging the lower track. The upper track is typically coupled to the bottom surface of the seat cushion to allow for sliding movement of the seat cushion, and the seat back attached thereto, along the lower track. A locking mechanism is generally operatively coupled between the upper and lower tracks to selectively lock the position of the upper track relative to the lower track. Forward movement of the seat assembly allows easy entry into a rear seat assembly of the passenger compartment by providing extra space between the seat assembly and the seat behind the seat assembly.

It is desirable to provide a seat assembly with a linkage for moving the seat cushion into the forwardly dumped position, while also providing a seat track release mechanism for allowing fore and aft movement of the seat assembly to allow for easier access into the vehicle.

SUMMARY OF THE INVENTION

According to one aspect of the invention, a seat assembly for an automotive vehicle includes a seat cushion and a seat back pivotally coupled to the seat cushion. A riser mechanism extends between the seat cushion and a vehicle floor. The riser mechanism includes spaced apart front, center, and rear legs each pivotally movable at opposing upper and lower ends. A latch mechanism is operably coupled to each of the center legs for movement between a latched position preventing movement of front, center, and rear legs relative to the vehicle floor, and an unlatched position allowing pivotal movement of each of the front, center, and rear legs relative to the floor for moving the seat assembly between a seating position and at least one of an easy entry and forwardly dumped positions.

According to another aspect of the invention, a seat assembly for an automotive vehicle includes a seat cushion and a seat back pivotally secured to the seat cushion. A track is fixedly secured to a vehicle floor. A link bar slidingly engages the track for forward and rearward movement therealong. A riser mechanism extends between the seat cushion and the track. The riser mechanism includes front, center, and rear legs each having a pivotally movable upper end and an opposing lower end pivotally secured to the link bar. A latch mechanism is operably coupled to the center leg for movement between a latched position preventing movement of the front, center, and rear legs relative to the vehicle floor and an unlatched position allowing pivotal movement of each of the front, center, and rear legs relative to the floor. A track release mechanism is operably connected to the front leg for allowing sliding movement of the link bar along the track in response to pivotal movement of the front leg when the latch mechanism is in the unlatched position to move the seat assembly between a seating position and one of an easy entry and forwardly dumped positions.

BRIEF DESCRIPTION OF THE DRAWINGS

Advantages of the present invention will be readily appreciated as the same becomes better understood by reference to the following detailed description when considered in connection with the accompanying drawings wherein:

FIG. 11 is a side view of the track release mechanism in a secondary locked position when the seat assembly is in the forwardly dumped position.

DETAILED DESCRIPTION OF THE PREFERRED EMBODIMENTS

Figure 1:
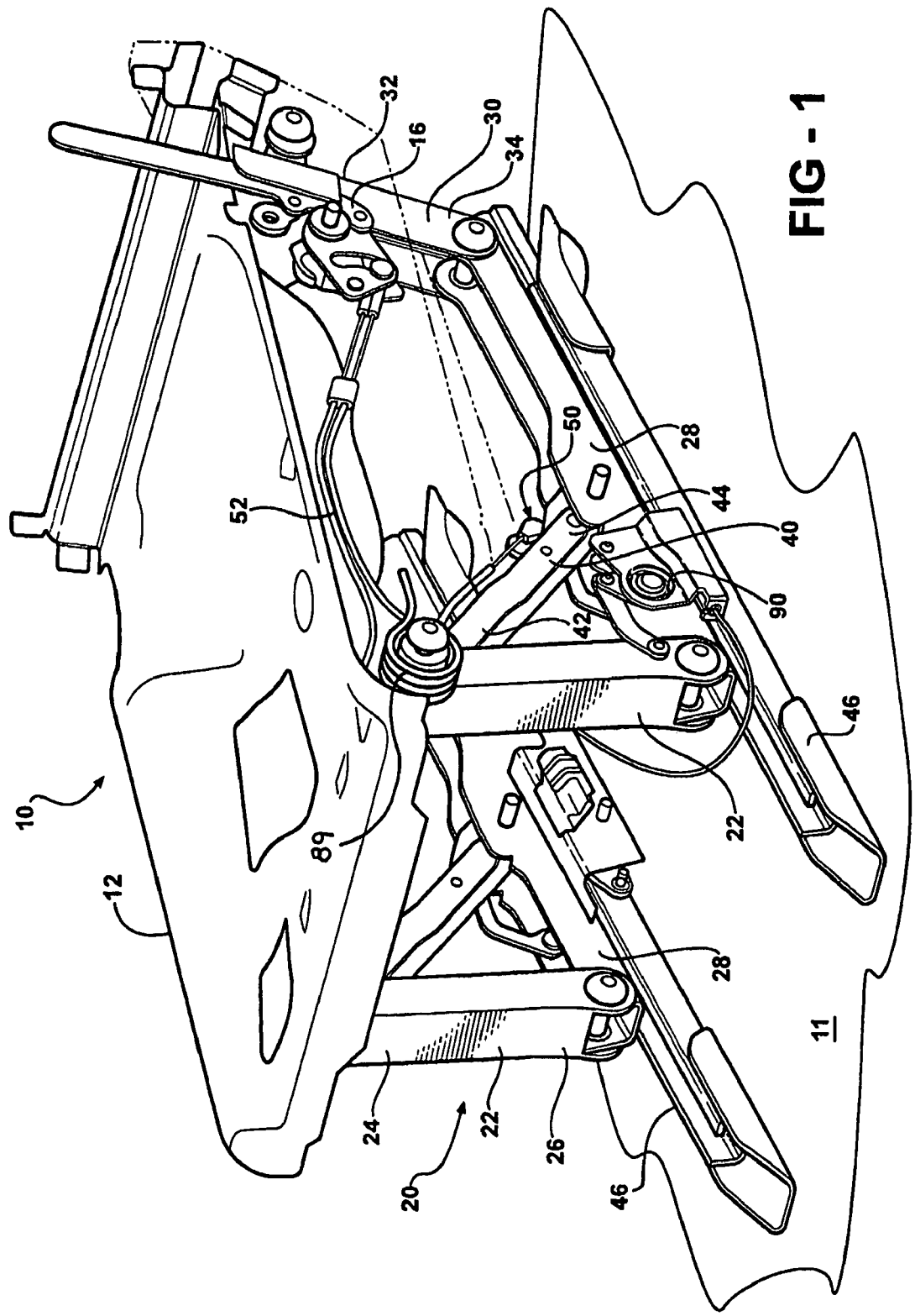
FIG. 1 is a perspective view of a seat assembly in a seating position.

Referring to FIG. 1, a seat assembly, generally shown at 10, is provided for supporting an occupant above a floor 11 of an automotive vehicle. The seat assembly 10 includes a seat cushion 12 and a seat back (not shown) operatively coupled to the seat cushion 12 by a recliner mechanism 16 of any suitable type. The recliner mechanism 16 allows for pivotal adjustment and selective locking of the seat back relative to the seat cushion 12 between a plurality of generally upright and reclined seating positions and a forwardly folded position overlying the seat cushion 12. The recliner mechanism 16 is biased internally, as is known by those of ordinary skill in the art, toward a locked position.

Figure 2:
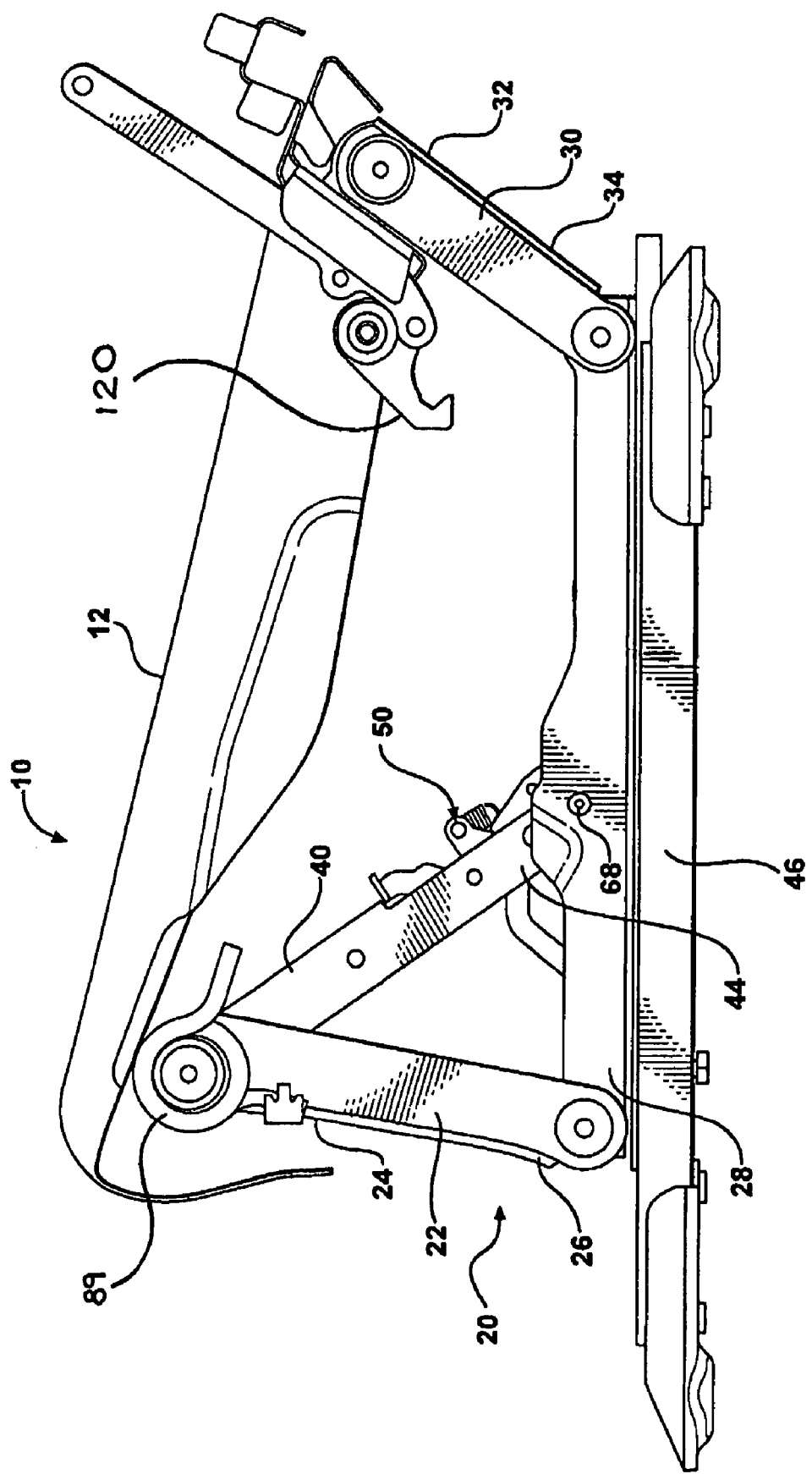
FIG. 2 is a side view of the seat assembly in the seating position.
Figure 3:
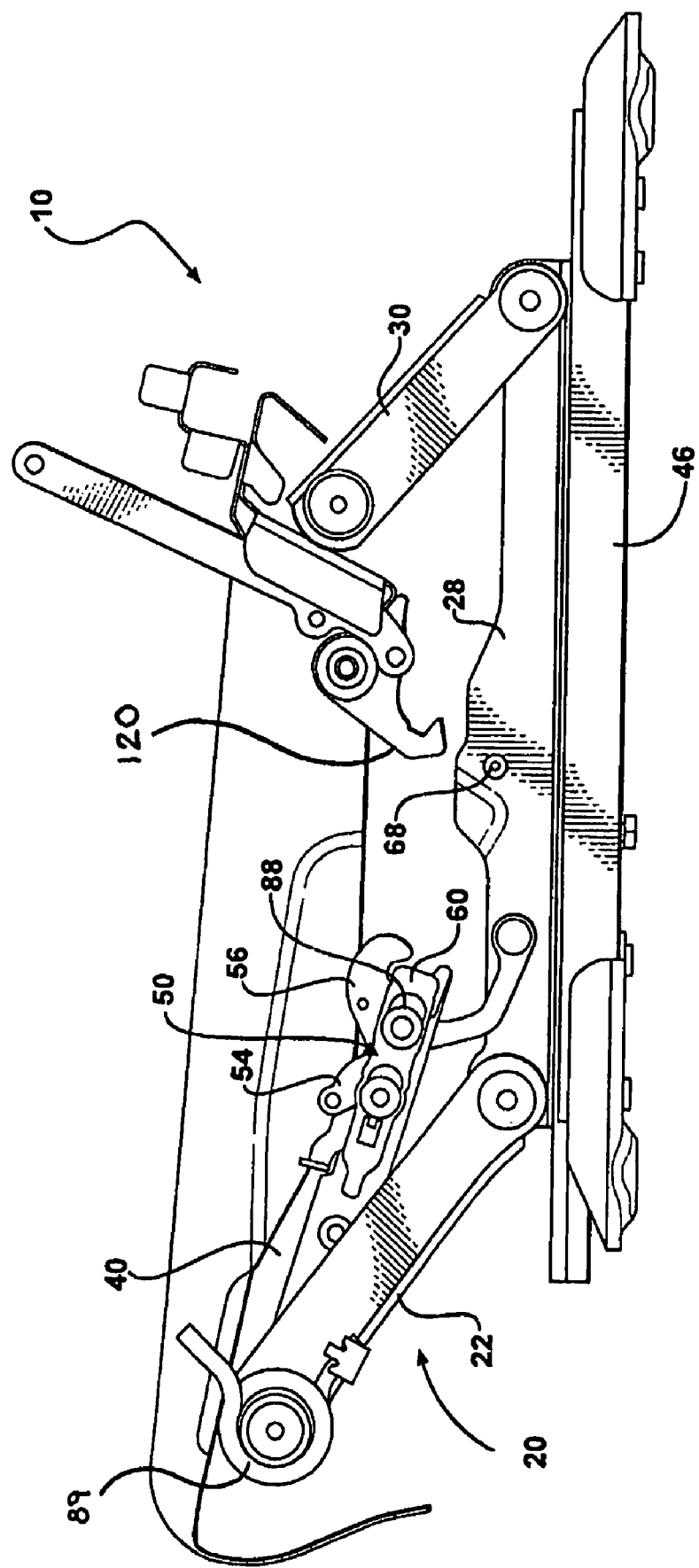
FIG. 3 is a side view of the seat assembly in an easy entry position.
Figure 4:
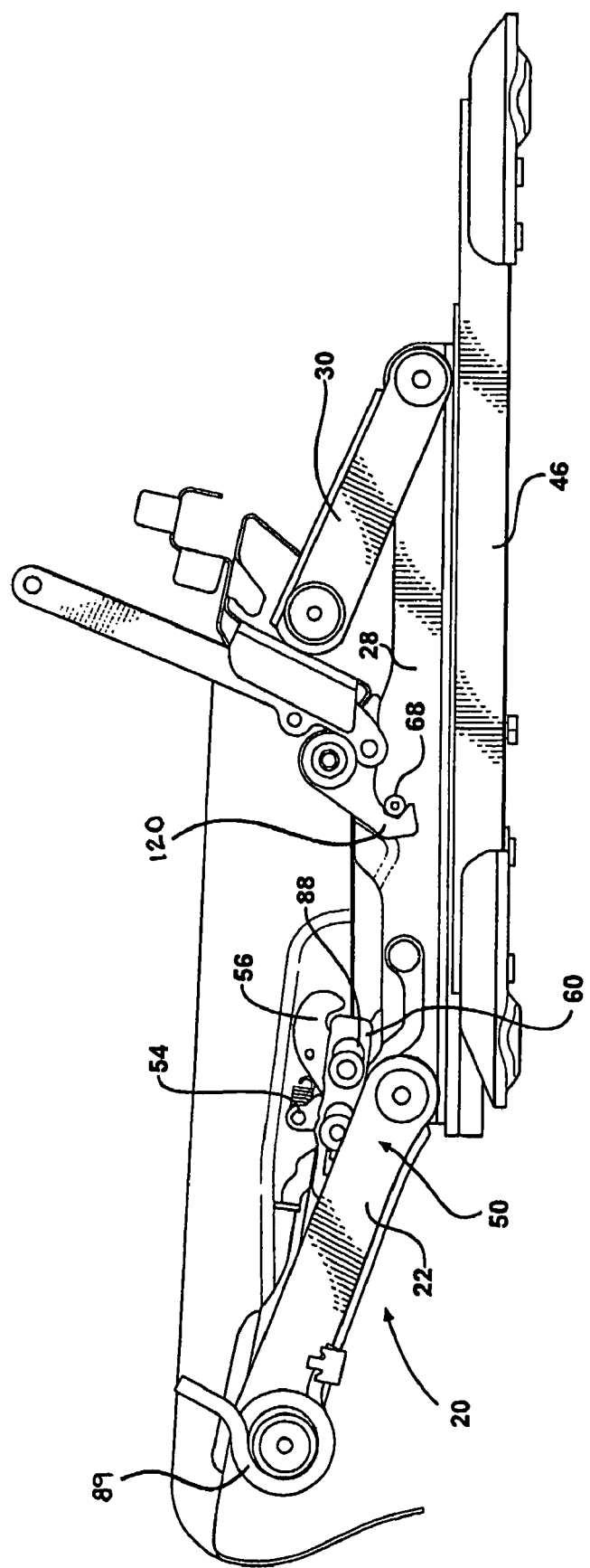
FIG. 4 is a side view of the seat assembly in a forwardly dumped position.

A riser mechanism, generally shown at 20, extends between the seat cushion 12 and the floor 11 for allowing movement of the seat assembly 10 between a seating position, shown in FIGS. 1 and 2, an easy entry position, shown in FIG. 3, and a forwardly dumped position, shown in FIG. 4. The riser mechanism 20 includes generally parallel and spaced apart front legs 22 each having an upper end 24 pivotally coupled to the seat cushion 12 and a lower end 26 pivotally coupled to a link bar 28. The riser mechanism 20 also includes generally parallel and spaced apart rear legs 30 each having an upper end 32 pivotally coupled to the seat cushion 12 and a lower end 34 pivotally coupled to one of the link bars 28. The riser mechanism 20 further includes center legs 40 each having a first end 42 pivotally coupled to one of the front legs 22 and a second end 44 pivotally coupled to one of the link bars 28. Each of the link bars 28 slidingly engages a track 46 to allow forward and rearward movement of the seat assembly 10 relative to the floor 11.

Figure 5:
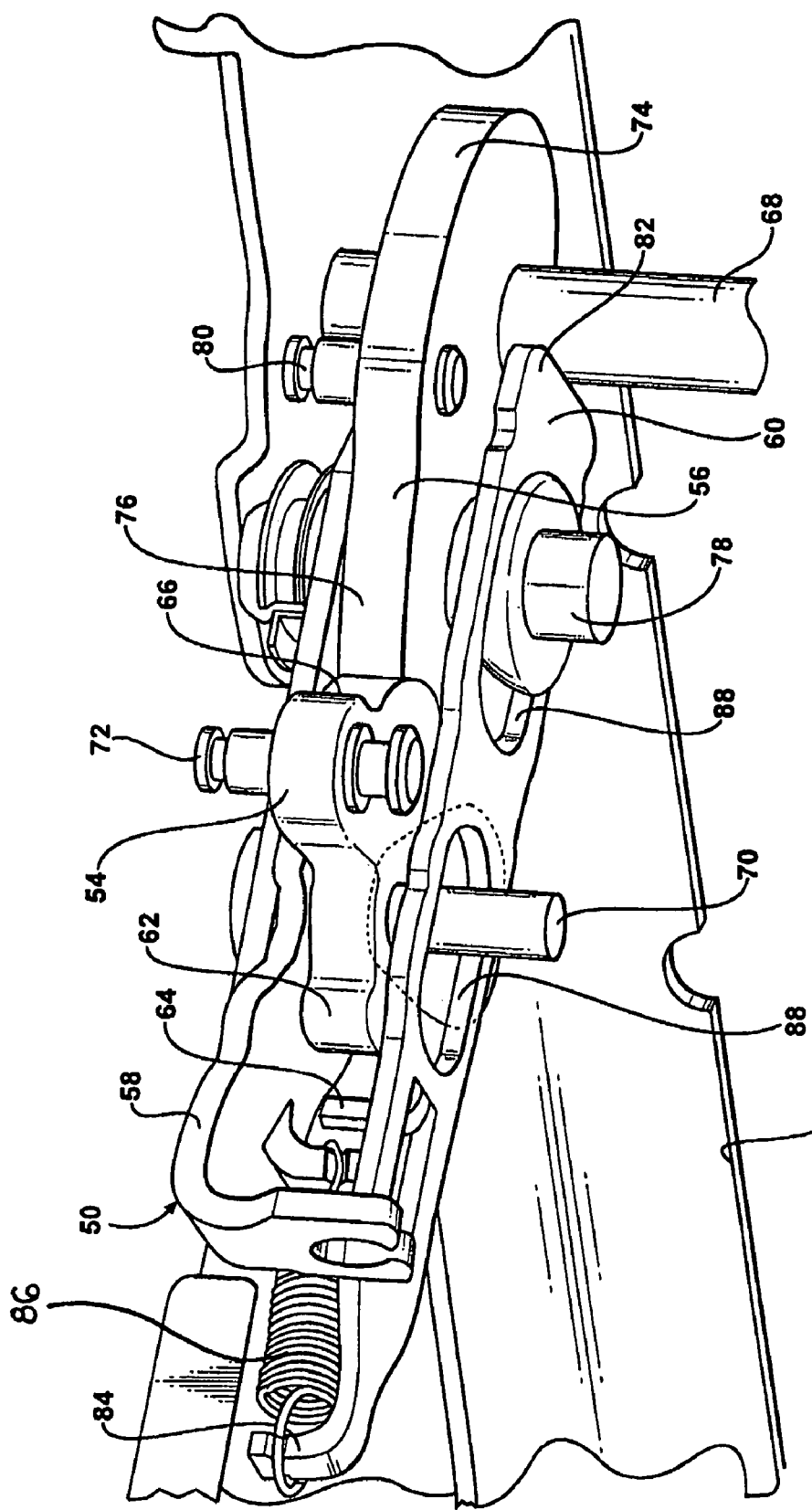
FIG. 5 is a perspective view of a latch mechanism, associated with a center leg of the seat assembly, in a latched position engaging a striker.
Figure 6:
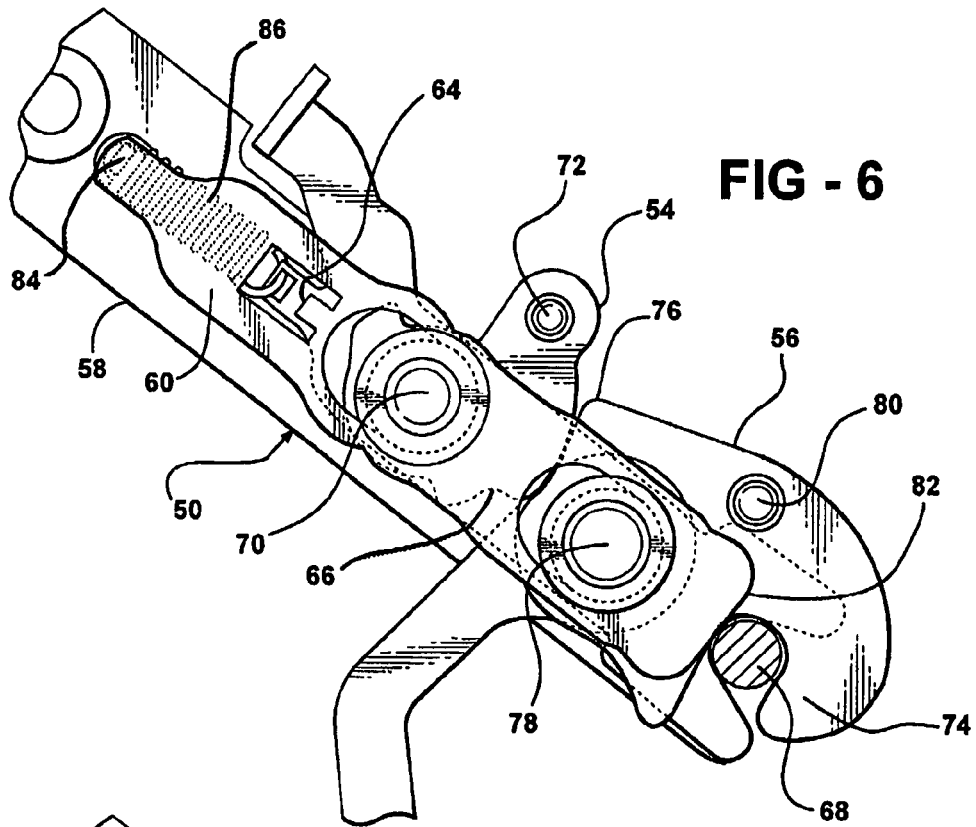
FIG. 6 is a bottom view of the latch mechanism in the latched position.
Figure 8:
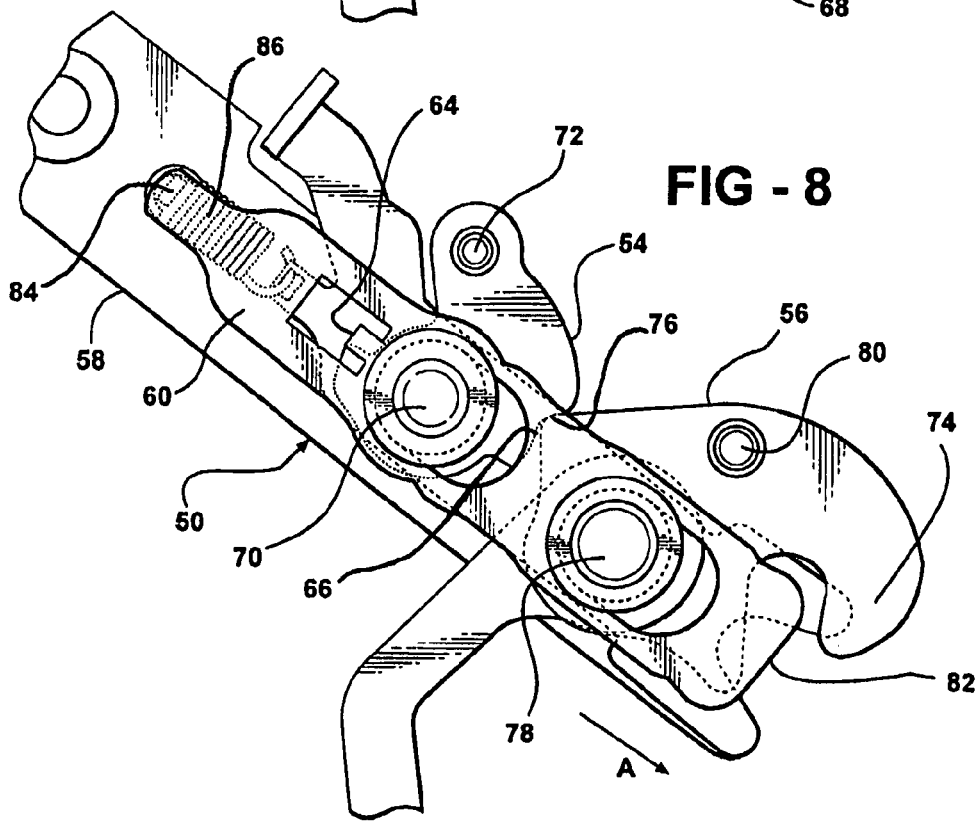
FIG. 8 is a bottom view of the latch mechanism in the unlatched position.
Figure 7:
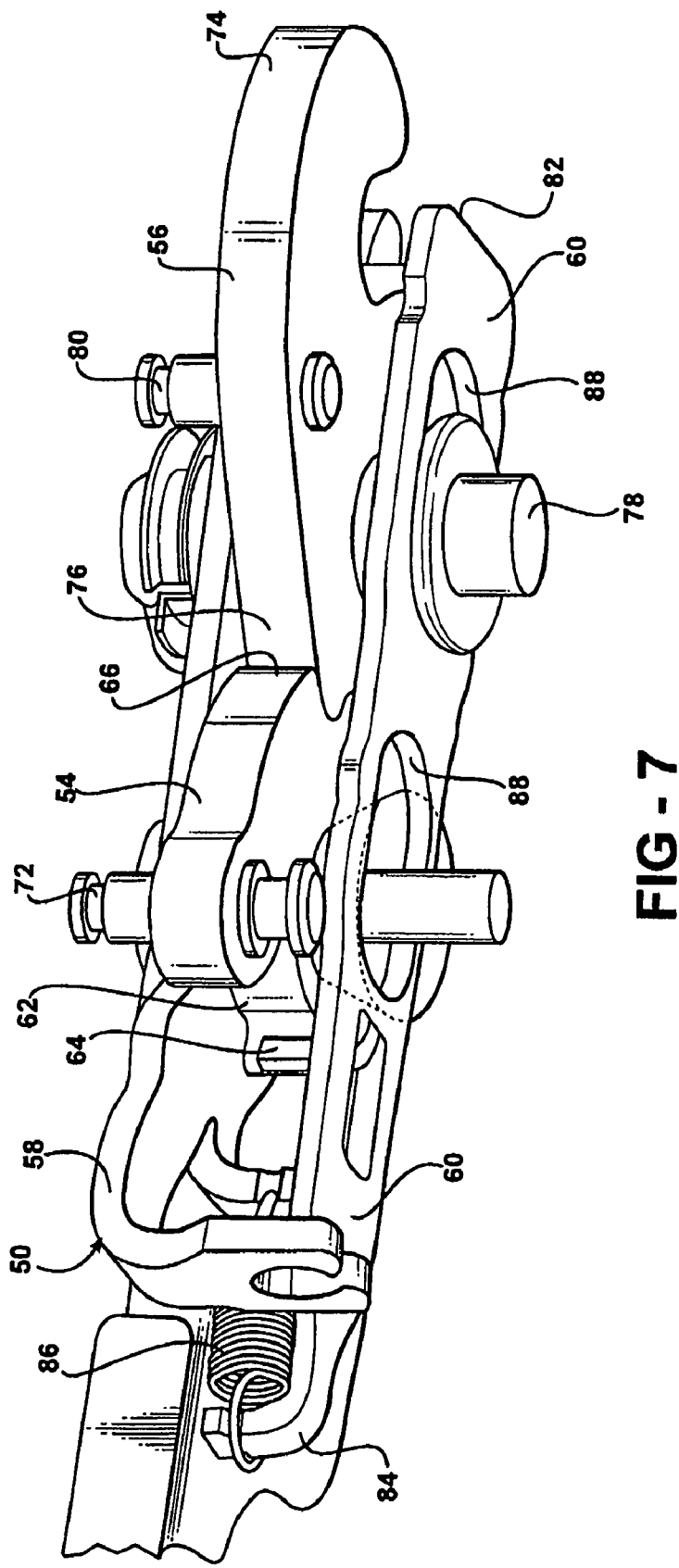
FIG. 7 is a perspective view of the latch mechanism in an unlatched position.

A latch mechanism, generally indicated at 50, is operably coupled to each center leg 40 for movement between a latched position engaging a striker 68 extending out from the link bar 28, shown in FIGS. 5 and 6, and an unlatched position, shown in FIGS. 7 and 8. The latch mechanism 50 is linked to the recliner mechanism 16 by cables 52. It is appreciated that although the cables 52 are utilized to link the latch mechanism 50 to the recliner mechanism 16, alternative linking devices may be used. Upon actuation of the recliner mechanism 16, the cables 52 urge the latch mechanism 50 from its latched position into its unlatched position to allow pivotal movement of the seat assembly 10 about the legs 22, 30, 40 between the seating position and either of the easy entry and forwardly dumped positions.

Referring to FIGS. 5 through 8, the latch mechanism 50 includes a cam 54, a latch hook 56, and spaced apart fixed 58 and movable 60 plates receiving the cam 54 and latch hook 56 therebetween. The cam 54 is an irregular shaped body having a lobe 62, a notch 66, and a cable coupling 72 for connecting with one of the cables 52. The cam 54 pivots about a pin 70 connected to the center leg 40.

The latch hook 56 is an arcuate member having a hook portion 74 engageable with the striker 68. The hook portion 74 terminates at an opposing angled end 76 that is selectively engaged by the notch 66. The latch hook 56 pivots about a pin 78 connected to the center leg 40. In addition, the latch hook 56 includes a cable coupling 80 for connecting to one of the cables 52.

The movable plate 60 is a generally rectangular member having a first end 82 shaped to engage the striker 68, and an opposing second end 84 that is bent. The movable plate 60 also includes a tab 64 selectively engaging the lobe 62 of the cam 54. The movable plate 60 further includes spaced apart lost motion slots 88 formed therein for receiving the pivot pins 70, 78 of the respective cam 54 and latch hook 56. The lost motion slots 88 allow for movement of the movable plate 60 relative to the fixed plate 58.

A spring 86 includes one end attached to the second end 84 of the movable plate 60 and an opposing end attached to the fixed plate 58. The spring 86 biases the movable plate 60 in the direction of arrow A, shown in FIG. 8.

Referring to FIGS. 5 and 6, when the latch hook 56 is in the latched position engaging the striker 68, the striker 68 contacts the first end 82 of the movable plate 60 such that the movable plate 60 is moved against the biasing force of the spring 86. Thus, the tab 64 is disengaged from the lobe 62 of the cam 54. Upon actuation of the recliner mechanism 16, the cable 52, via the cable couplings 72, 80, urges the cam 54 and latch hook 56 to pivot about the respective pins 70, 78 so that the striker 68 is released from the latch hook 56. The cam 54 and latch hook 56 pivot until the angled end 76 of the latch hook 56 is engaged by the notch 66 formed in the cam 54, as shown in FIGS. 7 and 8. Simultaneously, the movable plate 60 is biased forward by the spring 86, in the direction of arrow A, so that the tab 64 engages the lobe 62 of the cam 54 to block the cam 54 and maintain the latch mechanism 50 in the unlatched position.

When the latch mechanism 50 is in the unlatched position, the seat assembly 10 is free to pivot about the legs 22, 30, 40 against the bias of a counterbalance spring 89, shown in FIGS. 1 through 4, into either of the easy entry and forwardly dumped positions. When the seat assembly 10 is returned to the seating position, the striker 68 forces the first end 82 of the movable plate 60 into movement against the bias of the spring 86, which in turn moves the tab 64 out of engagement with the cam 54, freeing the latch hook 56 to engage the striker 68 so that the latch mechanism 50 is in the locked position.

Figure 9:
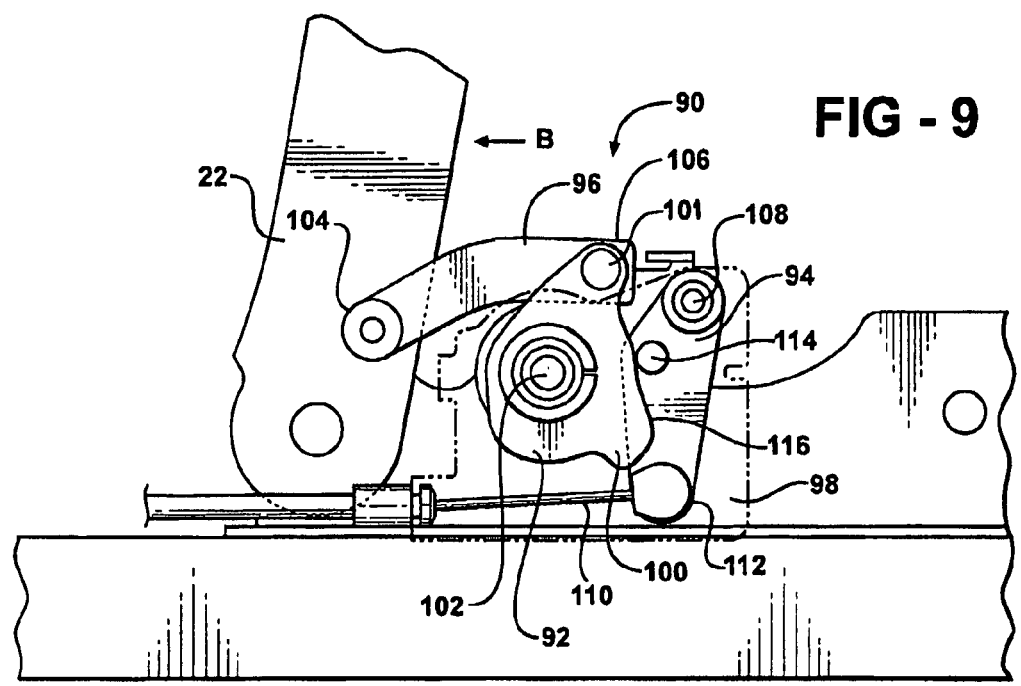
FIG. 9 is a side view of a track release mechanism in a locked position as the latch mechanism retains the seat assembly in the seating position.
Figure 10:
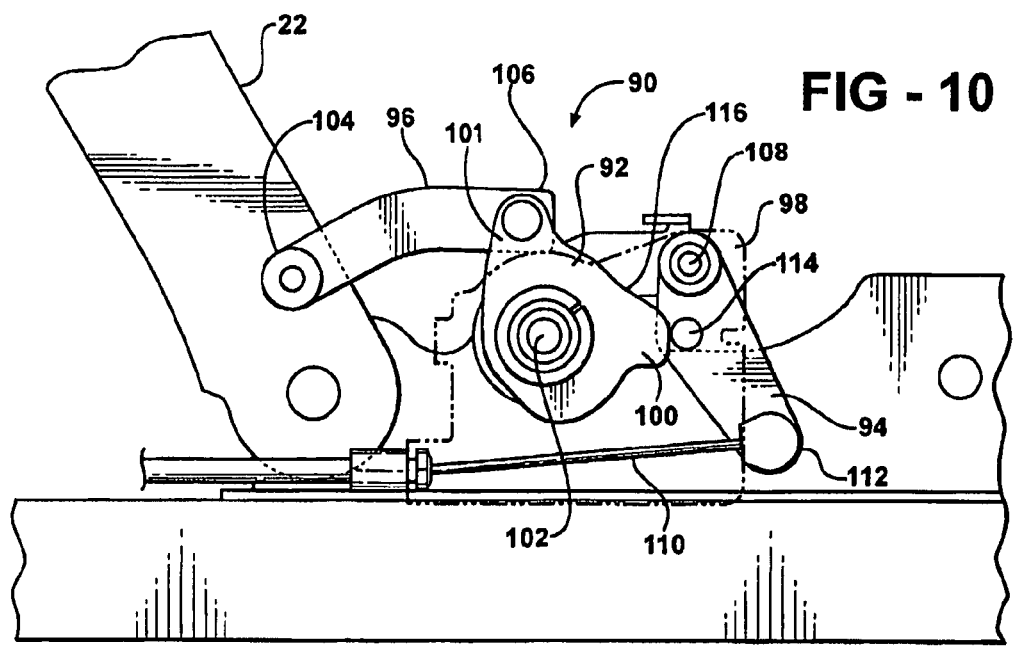
FIG. 10 is a side view of the track release mechanism in a released position allowing movement of the seat assembly into one of the easy entry and forwardly dumped position.

Referring back to FIG. 1, a track release mechanism, generally indicated at 90, is operably connected with the track 46, link bars 28 and front legs 22 for allowing selective forward and rearward movement of the seat assembly 10 relative to the floor 11. Referring now to FIGS. 9 through 11, the track release mechanism 90 includes a cam member 92 rotatably mounted along a bracket 98 by a pin 102. The cam member 92 is an irregular shaped body having lobes 100, 101 protruding radially therefrom and defining an outer surface 116.

The track release mechanism 90 also includes a pawl 94 having an angular body that is pivotally coupled to the bracket 98 at one end 108, and connected to a cable 110 at an opposing end 112. The pawl 94 also includes a pin 114 protruding therefrom for contacting the outer surface 116 of the cam member 92.

The track release mechanism 90 further includes an arm 96 having an arcuate shaped body that is pivotally connected to the front leg 22 at one end 104, and to one of the lobes 101 of the cam member 92 at an opposite end 106.

The track release mechanism 90 is locked, as shown in FIG. 9, when the seat assembly 10 is in the seating position. As a result, forward and rearward movement of the seat assembly 10 along the track 46 is prohibited. When the latch mechanism 50 is, however, moved into the unlatched position, as described above, the seat assembly 10 is free to pivot about each front leg 22, which pulls the arm 96 generally in the direction of arrow B in FIG. 9. As a result, the cam member 92, which is pivotally connected to the arm 96, rotates counterclockwise about the pin 102, as shown in FIG. 10. As the cam member 92 rotates, the pin 114 travels along the outer surface 116 of the cam member 92, which in turn causes pivotal movement of the pawl 94 about the end 108. The cable 110 attached to the end 112 of the pawl 94 is thus pulled, which releases a locking mechanism (not shown) to allow sliding movement of the link bar 28 along the track 46. Thus, the seat assembly 10 is now free to simultaneously pivot about the legs 22, 30, 40 and slide along the track 46, which facilitates movement of the seat assembly 10 into either of the easy entry position, shown in FIG. 3, and forwardly dumped position, shown in FIG. 4.

A catch 120 is disposed along a rear portion of the seat assembly 10 for selectively engaging the striker 68. The engagement of the catch 120 and striker 68 locks the seat assembly 10 in the forwardly dumped position, as shown in FIG. 4.

In operation, starting with the seat assembly 10 in the seating position, the latch mechanism 50 in the latched position, and the track release mechanism 90 in the locked position, a user actuates the recliner mechanism 16 to move the seat assembly 10 into one of the easy entry and forwardly dumped positions. As a result of the actuation of the recliner mechanism 16, the cables 52 urge the cam 54 and the latch hook 56 of the latch mechanism 50 into pivotal movement about the respective pins 70, 78 so that the latch hook 56 releases the striker 68. The notch 66 of the cam 54 engages the angled end 76 of the latch hook 56, and the tab 64 of the movable plate 60 engages the lobe 62 to maintain the engagement between the cam 54 and the latch hook 56. At this time, the latch mechanism 50 is in the unlatched position. The seat assembly 10 is now free to pivot about the legs 22, 30, 40. Pivotal movement of the front leg 22 urges the arm 96 of the track release mechanism 90 to move in the direction of arrow B, as shown in FIG. 10. The movement of the arm 96 causes the cam member 92 to rotate about the pin 102. As the cam member 92 rotates, the pin 114 of the pawl 94 travels along the outer surface 116 of the cam member 92 to cause pivotal movement of the pawl 94. As the pawl 94 pivots, the cable 110 is pulled, which releases the locking mechanism. As a result, the link bar 28, which is pivotally coupled to each of the legs 22, 30, 40 is free to slide along the track 46. The user may move the seat assembly 10, which is simultaneously pivoting about the legs 22, 30, 40 and sliding along the track 46, into the easy entry position, shown in FIG. 3, in order to allow an individual to enter a space behind the seat assembly 10. If, after movement of the seat assembly 10 into the easy entry position, the user desires to return the seat assembly 10 to the seating position, the user manually urges the seat assembly 10 towards the seating position. The bias of the counter balance spring 89 assists the user in returning the seat assembly 10 to the seating position.

On the other hand, if the user wants to continue pivotal movement of the seat assembly 10 past the easy entry position and into the forwardly dumped position, the user will continue to pivot the seat assembly 10 about the legs 22, 30, 40 and slide the seat assembly 10 along the track 46 towards the forwardly dumped position. The continued pivotal movement of the front leg 22 causes further travel of the pin 114 along the outer surface 116 of the cam member 92 until the pawl 94 returns to its starting position, as shown in FIG. 11. Now, the track release mechanism 90 has reached a secondary locked position, in which further forward movement of the link bar 28 along the track 46 is prevented. At the same time, the catch 120 engages the striker 68 to prevent further pivotal movement about the legs 22, 30, 40 and maintain the seat assembly 10 in the forwardly dumped position, as shown in FIG. 4.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for an automotive vehicle comprising:
   a seat cushion;
   a seat back pivotally coupled to said seat cushion;
   a riser mechanism extending between said seat cushion and a vehicle floor, said riser mechanism having spaced apart front, center, and rear legs each pivotally movable at opposing upper and lower ends;
   a latch mechanism operably coupled to each of said center legs for movement between a latched position preventing movement of said front, center, and rear legs relative to the floor and an unlatched position allowing pivotal movement of each of said front, center, and rear legs relative to the floor for moving said seat assembly between a seating position and at least one of an easy entry and forwardly dumped positions; and
   a track release mechanism operably connected to said front leg for allowing fore and aft movement of said seat assembly relative to the vehicle floor in response to pivotal movement of said front leg.

2. A seat assembly as set forth in claim 1 including a counterbalance spring operably coupled to said front leg for biasing said seat assembly into said seating position.

3. A seat assembly as set forth in claim 2 including a link bar pivotally secured to each of said front, center, and rear legs at said lower end thereof.

4. A seat assembly as set forth in claim 3 including a striker extending out from said link bar.

5. A seat assembly as set forth in claim 4 including a catch operably coupled to said seat cushion and engageable with said striker for locking said seat assembly in said forwardly dumped position.

6. A seat assembly as set forth in claim 5 wherein said latch mechanism includes a latch hook pivotally mounted about said center leg and engageable with said striker for maintaining said latch mechanism in said latched position.

7. A seat assembly as set forth in claim 6 wherein said latch mechanism includes a cam pivotally mounted about said center leg and engageable with said latch hook for maintaining said latch mechanism in said unlatched position.

8. A seat assembly as set forth in claim 7 wherein said latch mechanism includes a movable plate having a tab engageable with a portion of said cam to lock said cam into engagement with said latch hook.

9. A seat assembly as set forth in claim 8 wherein said latch mechanism includes a spring attached to said movable plate for biasing said tab into engagement with said cam.

10. A seat assembly for an automotive vehicle comprising:
    a seat cushion;
    a seat back pivotally coupled to said seat cushion;
    a track adapted to be fixedly secured to a vehicle floor;
    a link bar slidingly engaging said track for forward and rearward movement therealong;
    a riser mechanism extending between said seat cushion and said track, said riser mechanism having front, center, and rear legs each having a pivotally movable upper end and an opposing lower end pivotally secured to said link bar;
    a latch mechanism operably coupled to said center leg for movement between a latched position preventing movement of said front, center, and rear legs relative to the floor and an unlatched position allowing pivotal movement of each of said front, center, and rear legs relative to the floor; and
    a track release mechanism operably connected to said front leg for allowing sliding movement of said link bar along said track in response to pivotal movement of said front leg when said latch mechanism is in said unlatched position to move said seat assembly between a seating position and one of an easy entry and forwardly dumped position.

11. A seat assembly as set forth in claim 10 including a counterbalance spring operably coupled to said front leg for biasing said seat assembly into said seating position.

12. A seat assembly as set forth in claim 11 including a striker extending out from said link bar.

13. A seat assembly as set forth in claim 12 including a catch operably coupled to said seat cushion and engageable with said striker pin for locking said seat assembly in said forwardly dumped position.

14. A seat assembly as set forth in claim 13 wherein said track release mechanism includes a bracket operably coupled to said track.

15. A seat assembly as set forth in claim 14 wherein said track release mechanism includes a cam member rotatably mounted to said bracket.

16. A seat assembly as set forth in claim 15 wherein said track release mechanism includes an arm pivotally interconnected between said front leg and said cam member for selectively rotating said cam member in response to pivotal movement of said front leg.

17. A seat assembly as set forth in claim 16 wherein said track release mechanism includes a pawl pivotally coupled to said bracket.

18. A seat assembly as set forth in claim 17 wherein said pawl includes a pin contacting said release surface to translate rotational movement of said cam member into pivotal movement of said pawl for allowing sliding engagement of said link bar along said track.

* * * * *